US011629944B1

(12) United States Patent
Lee et al.

(10) Patent No.: US 11,629,944 B1
(45) Date of Patent: Apr. 18, 2023

(54) DEVICE AND METHOD FOR GENERATING DAMAGE MATRIX BASED ON WARHEAD FRAGMENT DATA AND TARGET VULNERABLE AREA DATA (71) Applicant: AGENCY FOR DEFENSE DEVELOPMENT, Daejeon (KR)

(72) Inventors: Kyeong Soo Lee, Daejeon (KR); Sungjun Park, Daejeon (KR)

(73) Assignee: Agency For Defense Development, Daejeon (KR)

( * ) Notice: Subject to any disclaimer, the term of this patent is extended or adjusted under 35 U.S.C. 154(b) by 0 days.

(21) Appl. No.: 17/819,411

(22) Filed: Aug. 12, 2022

(30) Foreign Application Priority Data

Oct. 7, 2021 (KR) .................. 10-2021-0133319

(51) Int. Cl.
*F42B 35/00* (2006.01)
*G06F 17/18* (2006.01)

(52) U.S. Cl.
CPC .............. *F42B 35/00* (2013.01); *G06F 17/18* (2013.01)

(58) Field of Classification Search
CPC ................................ F42B 35/00; G06F 17/18
See application file for complete search history.

(56) References Cited

U.S. PATENT DOCUMENTS

| 7,947,936 | B1 * | 5/2011 | Bobinchak | F41G 3/04 |
| | | | | 701/1 |
| 10,168,420 | B1 * | 1/2019 | Fluhler | G01S 13/536 |
| 10,352,668 | B1 * | 7/2019 | Hooke | F42B 12/74 |
| 2016/0025467 | A1 | 1/2016 | Botthof et al. | |
| 2020/0363175 | A1 * | 11/2020 | Rovinsky | B64C 39/024 |

FOREIGN PATENT DOCUMENTS

| CN | 104850747 B | * | 1/2018 |
| KR | 10-2321404 B1 | | 11/2021 |
| KR | 10-2334234 B1 | | 12/2021 |

OTHER PUBLICATIONS

Notice of Allowance dated Dec. 22, 2021 in Korean Application No. 10-2021-0133319.

* cited by examiner

*Primary Examiner* — Manuel A Rivera Vargas
*Assistant Examiner* — Yaritza H Perez Bermudez
(74) *Attorney, Agent, or Firm* — Knobbe, Martens, Olson & Bear, LLP

(57) ABSTRACT

A damage matrix generating device proposed. The damage matrix may include a memory and a processor configured to control the memory. The processor may acquire warhead fragment data obtained by classifying mass and number of fragments scattering in given directions as a warhead is detonated, and target vulnerable area data obtained by classifying a vulnerable area according to an encounter relationship between a fragment and a target. The processor may also generate a virtual target based on an approach direction of the fragment to each of the grids, the grids dividing a ground plane. The processor may further generate a damage matrix by extracting encounter information of fragments to meet the virtual target as the fragments scatter in the given directions based on the warhead fragment data and calculating a damage probability for each ground location according to the encounter information based on the target vulnerable area data.

16 Claims, 8 Drawing Sheets

| ENCOUNTER ELEVATION ANGLE (degree) | VELOCITY (ft) | | | | | MASS (grains) |
|---|---|---|---|---|---|---|
| | 500 | 1000 | 3000 | 5000 | 7000 | |
| -90 | 0.0000 | 0.0000 | 0.0000 | 0.0000 | 0.0000 | 5 |
| | 0.0000 | 0.0000 | 0.0000 | 2.8500 | 4.6500 | 120 |
| | 0.0000 | 0.0000 | 2.6800 | 7.3800 | 7.9200 | 500 |
| | 0.0000 | 0.6700 | 8.9600 | 10.890 | 11.470 | 6000 |
| 0 | 0.0000 | 0.0000 | 0.0000 | 0.0000 | 0.0000 | 5 |
| | 0.000 | 0.0000 | 0.0000 | 0.0263 | 0.0400 | 120 |
| | 0.0000 | 0.0000 | 0.0526 | 0.0667 | 0.4800 | 500 |
| | 0.0000 | 0.0823 | 1.1034 | 3.8600 | 5.0800 | 6000 |
| 30 | 0.0000 | 0.0000 | 0.0000 | 0.0000 | 0.0000 | 5 |
| | 0.0000 | 0.0333 | 0.0287 | 0.1494 | 0.0874 | 120 |
| | 0.0000 | 0.0333 | 0.1494 | 0.8800 | 1.7800 | 500 |
| | 0.0400 | 0.0346 | 2.9800 | 8.6400 | 8.5200 | 6000 |
| 60 | 0.0000 | 0.0000 | 0.0533 | 0.0400 | 0.0400 | 5 |
| | 0.0000 | 0.0400 | 0.0667 | 1.1100 | 2.0800 | 120 |
| | 0.0000 | 0.0666 | 1.5400 | 4.1800 | 5.5100 | 500 |
| | 0.0800 | 0.0666 | 7.7400 | 12.310 | 14.680 | 6000 |
| 90 | 0.0000 | 0.0000 | 0.0100 | 0.0200 | 0.0000 | 5 |
| | 0.0000 | 0.0300 | 0.0700 | 2.2500 | 6.5500 | 120 |
| | 0.0300 | 0.0666 | 2.2610 | 1.8500 | 10.580 | 500 |
| | 0.0800 | 0.0666 | 8.6300 | 10.850 | 0.0000 | 6000 |

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | .001 | 0 | 0 | 0 | .001 | 0 | 0 | 0 | 0 |
| 0 | 0 | 0 | 0 | .001 | .002 | .003 | .003 | .002 | .001 | 0 | 0 | 0 | 0 |
| 0 | .001 | .002 | .003 | .004 | .007 | .014 | .014 | .007 | .004 | .003 | .002 | .001 | 0 |
| 0 | 0 | 0 | .002 | .008 | .04 | .2274 | .227 | .04 | .007 | .002 | 0 | 0 | 0 |
| 0 | 0 | 0 | 0 | .001 | .002 | .049 | 0.49 | .002 | .001 | 0 | 0 | 0 | 0 |
| 0 | 0 | 0 | 0 | 0 | 0 | .002 | .002 | 0 | 0 | 0 | 0 | 0 | 0 |
| 0 | 0 | 0 | 0 | 0 | 0 | 0 | 0 | 0 | 0 | 0 | 0 | 0 | 0 |

FIG.8

DEVICE AND METHOD FOR GENERATING DAMAGE MATRIX BASED ON WARHEAD FRAGMENT DATA AND TARGET VULNERABLE AREA DATA

CROSS-REFERENCE TO RELATED APPLICATION

This application claims priority to Korean Patent Application No. 10-2021-0133319 filed on Oct. 7, 2021. The entire contents of the application on which the priority is based are incorporated herein by reference.

TECHNICAL FIELD

The present disclosure relates to a device and method for generating damage matrix based on warhead fragment data and target vulnerable area data, and a non-transitory computer-readable recording medium storing a computer program for performing the damage matrix generating method.

BACKGROUND

In general, in order to evaluate the effect of warhead power on a ground target, a damage matrix is generated and the warhead power is evaluated. The damage matrix is a data matrix expressed by dividing the ground into grids of a preset size with the location of the warhead detonation on the ground centered, and calculating a target killing probability at each grid location.

SUMMARY

The present disclosure provides a device and method for generating damage matrix, which is capable of performing rapid analysis based on analysis data based on warhead fragment data and target vulnerable area data when calculating a damage probability of a target, and a non-transitory computer-readable recording medium storing a computer program for performing the damage matrix generating method.

In accordance with an aspect of the present disclosure, there is provided a damage matrix generating device comprising: a memory; and a processor configured to control the memory to: acquire warhead fragment data obtained by classifying mass and number of fragments scattering in given directions as a warhead is detonated, and target vulnerable area data obtained by classifying a vulnerable area according to an encounter relationship between a fragment and a target; generate a virtual target based on an approach direction of the fragment to each of the grids, the grids dividing a ground plane; and generate a damage matrix by extracting encounter information of fragments to meet the virtual target as the fragments scatter in the given directions based on the warhead fragment data and calculating a damage probability for each ground location according to the encounter information based on the target vulnerable area data.

Herein, the processor is further configured to classify the mass and number of scattering fragments based on a polar angle and an azimuthal angle of a scattering direction of the fragments based on a detonation position.

Herein, the processor is further configured to divide the ground plane into the grids, and generate the virtual target by generating a virtual plane perpendicular to the approach direction of the fragment to each of the grids.

Herein, the virtual plane is perpendicular to a line segment connecting a point in each of the grids from a preset detonation point.

Herein, an area of the virtual target is equal to an exposure area of an actual target.

Herein, the virtual target has a shape of a circular area or a rectangular area equal to an exposure area of an actual target.

Herein, the encounter information includes information on a mass and a velocity of a fragment that meets the virtual target, and an encounter elevation angle of the virtual target and the fragment.

Herein, the processor is further configured to calculate a vulnerable area of the virtual target depending on the mass, the velocity, and the encounter elevation angle of the fragment by applying a linear interpolation method to the target vulnerable area data.

Herein, the processor is further configured to generate the damage matrix by calculating a damage probability for each grid location for all grids for the each ground location.

Herein, the processor is further configured to extract fragments passing through a circle of a preset radius from a center of the virtual target among fragments to meet the virtual target, and extract encounter information of fragments passing through the circle.

In accordance with another aspect of the present disclosure, there is provided a damage matrix generating method performed by a damage matrix generating device. The method comprising: acquiring warhead fragment data obtained by classifying mass and number of fragments scattering in given directions as a warhead is detonated, and target vulnerable area data obtained by classifying a vulnerable area according to an encounter relationship of a fragment and a target; generating a virtual target based on an approach direction of the fragment to each of the grids, the grids dividing a ground plane; and generating a damage matrix by extracting encounter information of fragments to meet the virtual target as the fragments scatter in the given directions based on the warhead fragment data, and calculating a damage probability for each ground location according to the encounter information based on the target vulnerable area data.

Herein, the acquiring warhead fragment data and the target vulnerable area data comprises: classifying the mass and number of scattering fragments based on a polar angle and an azimuthal angle of a scattering direction of the fragments based on a detonation position.

Herein, the generating a virtual target comprises: dividing the ground plane into the grids, and generate the virtual target by generating a virtual plane perpendicular to the approach direction of the fragment to each of the grids.

Herein, the encounter information includes information on a mass and a velocity of a fragment that meets the virtual target, and an encounter elevation angle of the virtual target and the fragment, and wherein the generating a damage matrix comprises: calculating a vulnerable area of the virtual target depending on the mass, the velocity, and the encounter elevation angle of the fragment by applying a linear interpolation method to the target vulnerable area data.

Herein, the generating a damage matrix comprises: extracting fragments passing through a circle of a preset radius from a center of the virtual target among fragments to meet the virtual target, and extract encounter information of fragments passing through the circle.

In accordance with still another aspect of the present disclosure, there is provided a non-transitory computer-readable recording medium storing a computer program including instructions which allow a processor to perform a damage matrix generating method comprising: acquiring warhead fragment data obtained by classifying mass and number of fragments scattering in given directions as a warhead is detonated, and target vulnerable area data obtained by classifying a vulnerable area according to an encounter relationship of a fragment and a target; generating a virtual target based on an approach direction of the fragment to each of the grids, the grids dividing a ground plane; and generating a damage matrix by extracting encounter information of fragments to meet the virtual target as the fragments scatter in the given directions based on the warhead fragment data, and calculating a damage probability for each ground location according to the encounter information based on the target vulnerable area data.

According to one embodiment of the present disclosure, it is possible to improve the accuracy and fidelity of the analysis for fragmentation bombs with low or non-uniform fragment density while utilizing the existing vulnerability analysis data as it is when developing or analyzing weapons. Further, if the embodiment of the present disclosure is applied to a simulation tool that can readily visualize the scattering of fragments, the convenience of analysis can be further improved, and it can be used as a technique for quickly calculating the weapon effect in the field.

As the demand for a technology for generating ammunition effect data is increasing. Accordingly, the embodiment of the present disclosure can be of great help to weapon system developers and analysts as a technique used in weapon system development, acquisition, cost analysis, military training, and logistics.

DETAILED DESCRIPTION

In generating a damage matrix, since the number of fragments in Z-data is small, it is difficult to statistically calculate a density of the fragments for each section. Further, in the case of fragmentation bombs having different fragment densities for each section due to the asymmetrical scattering distribution of fragments, the analysis fidelity of the damage matrix is significantly deteriorated.

Accordingly, there is a demand to develop a method of generating the damage matrix, which is capable of increasing the fidelity of analysis when calculating weapon power and quickly calculating the effect of the weapon even in the field.

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
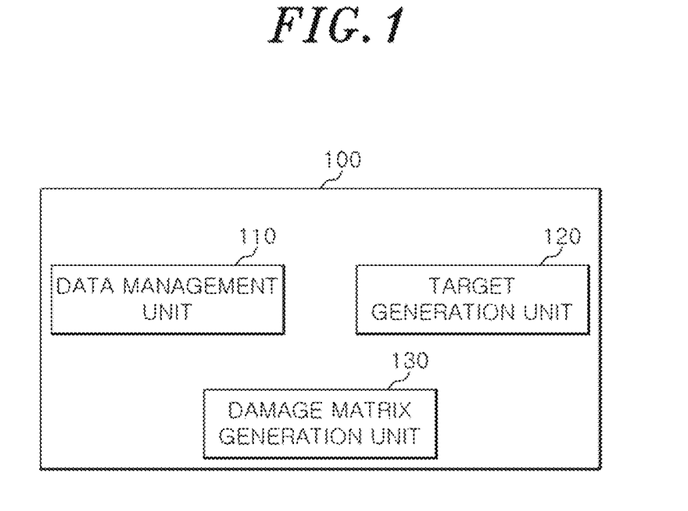
FIG. 1 is a functional block diagram of a damage matrix generating device according to one embodiment of the present disclosure.

FIG. 1 is a functional block diagram of a damage matrix generating device 100 according to one embodiment of the present disclosure. The damage matrix generating device 100 according to one embodiment of the present disclosure may perform an overall operation using one or more processors, and the one or more processors may control the functional blocks included in FIG. 1 to perform operations to be described later.

Referring to FIG. 1, the damage matrix generating device 100 according to one embodiment of the present disclosure may include a data management unit 110, a target generating unit 120, and a damage matrix generating unit 130.

The data management unit 110 may acquire warhead fragment data obtained by classifying the mass of fragments and the number of fragments scattered in given directions as the warhead is detonated. The data management unit 110 may acquire target vulnerable area data obtained by classifying a vulnerable area according to an encounter relationship between a fragment and a target. The data management unit 110 may have a hardware memory or be linked with a cloud server to acquire or store warhead fragment data and target vulnerable area data.

Figure 2:
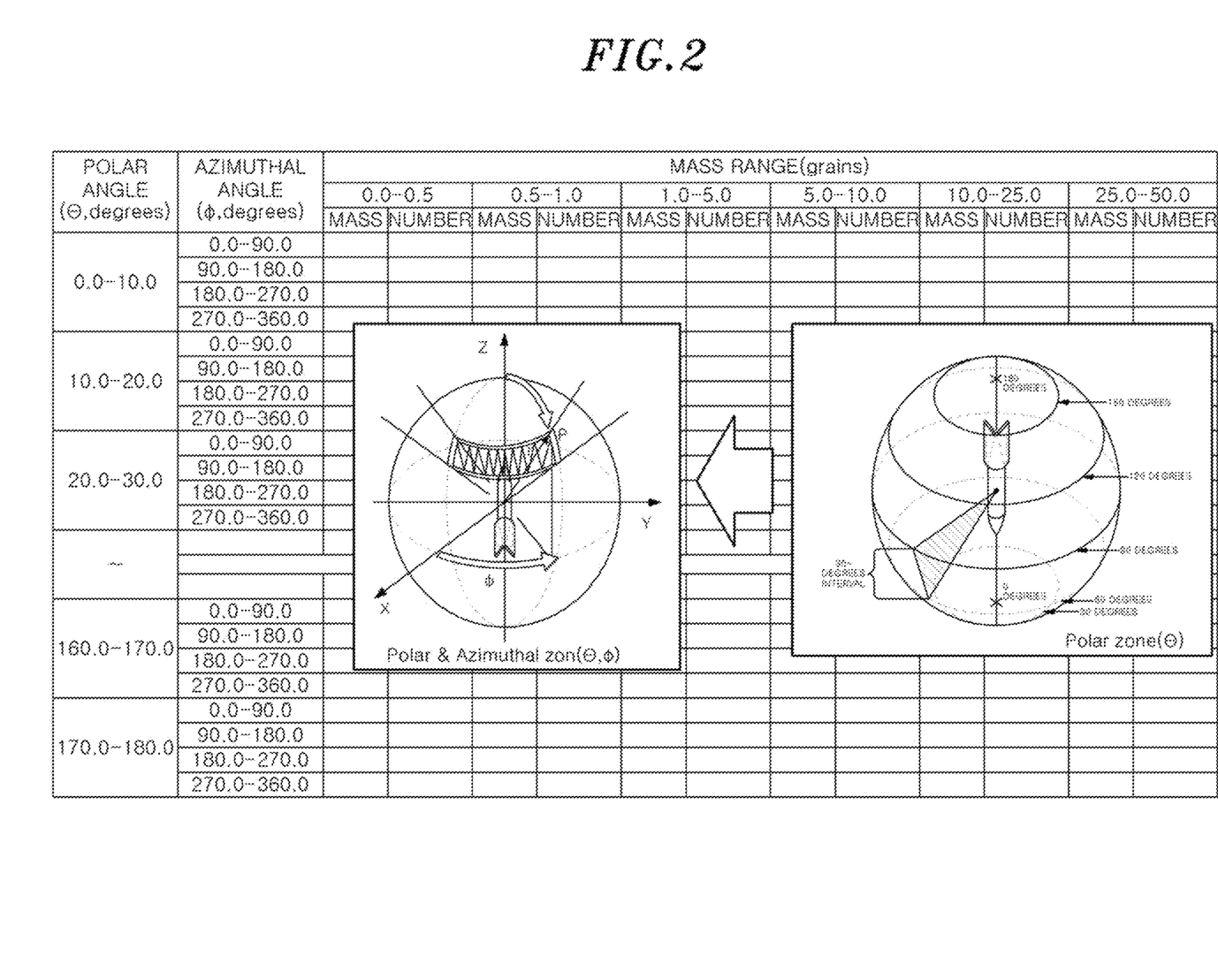
FIG. 2 is an exemplary diagram of warhead fragment data according to one embodiment of the present disclosure.

FIG. 2 is an exemplary diagram of the warhead fragment data according to one embodiment of the present disclosure.

Referring to FIG. 2, the warhead fragment data may include the determined data by classifying zones categorized according to the scattering directions of warhead fragments based on a polar angle (spherical coordinate axis from the head to the tail of a projectile) and an azimuthal angle (spherical coordinate axis with the projectile axis as the center of rotation) in a spherical coordinate system and simulating characteristics (e.g., mass, number, velocity) of the fragments for each zone for a predetermined warhead weapon.

Figure 3:
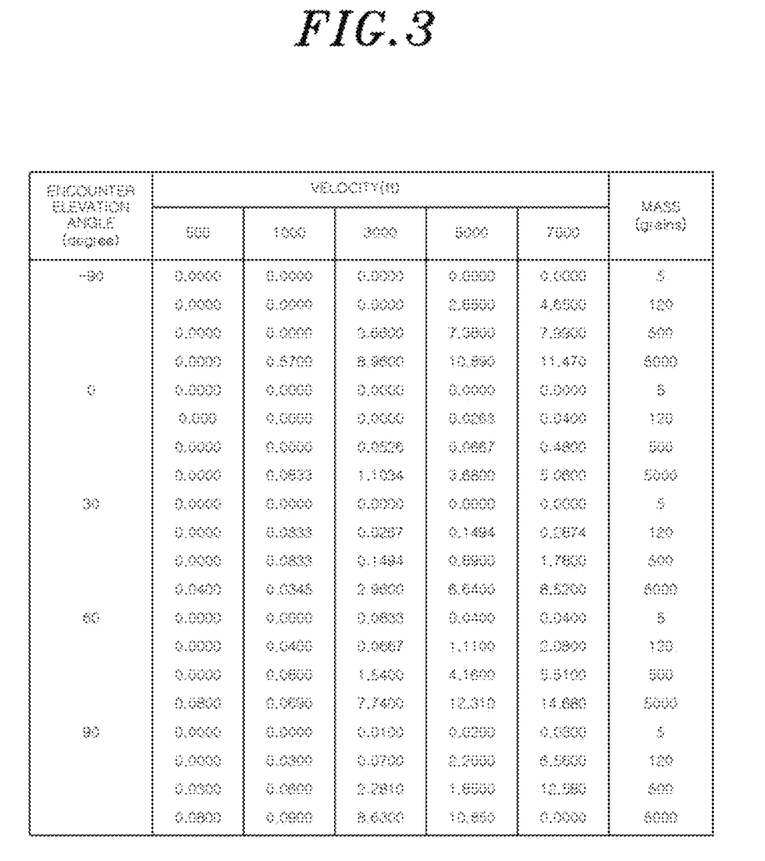
FIG. 3 is an exemplary diagram of target vulnerable area data according to one embodiment of the present disclosure.

FIG. 3 is an exemplary diagram of the target vulnerable area data according to one embodiment of the present disclosure.

Referring to FIG. 3, the target vulnerable area data may include data calculated in advance by categorizing vulnerable areas depending on fragment characteristics (e.g., velocity, mass, material) in a specific encounter relationship (e.g., elevation angle) between the fragment and the target. The vulnerable area may be defined as a value obtained by multiplying an exposure area in which a target is exposed to a threat by a conditional probability that the exposure area is hit and incapacitated. In this case, the exposure area may mean an exposure area of an actual target (e.g., a front or side area of a tank).

Figure 4:
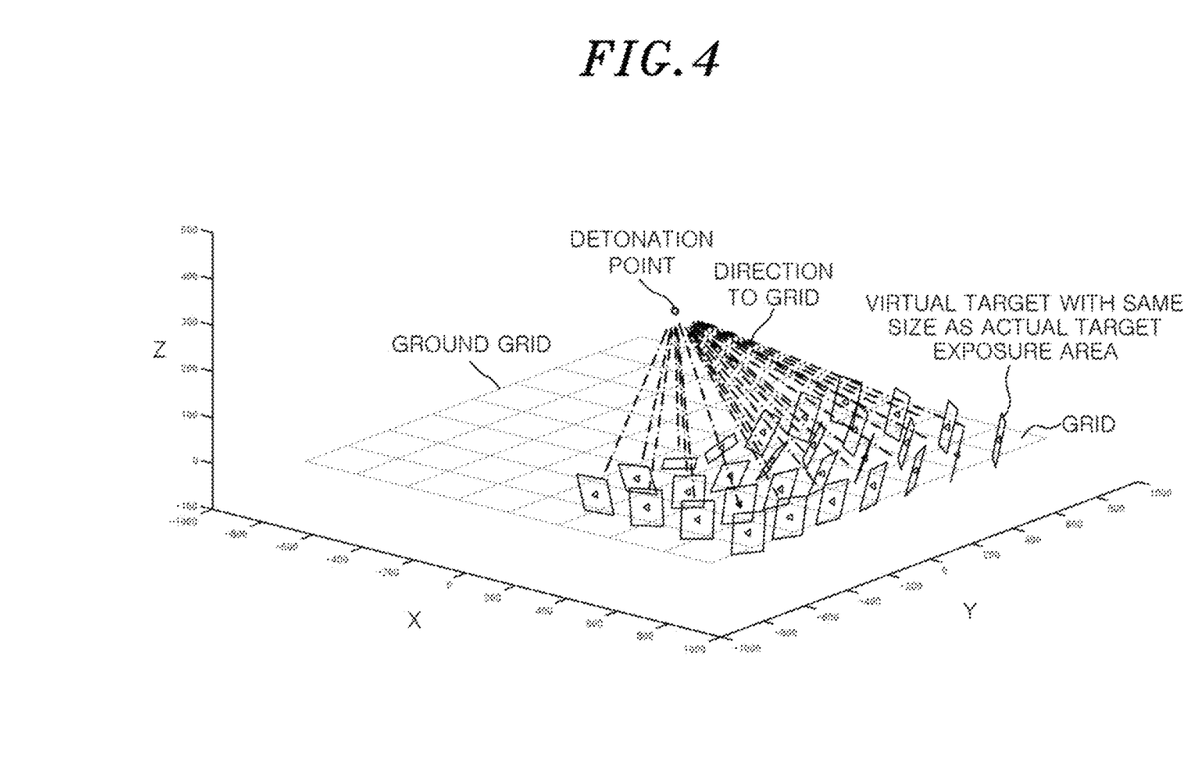
FIG. 4 is an exemplary diagram of an operation of dividing a ground plane into grids and generating a virtual target having the same size as an actual target exposure area based on an approach direction of a fragment to each grid according to one embodiment of the present disclosure.

FIG. 4 is an exemplary diagram of an operation of dividing a ground plane into grids and generating a virtual target based on an approach direction of a fragment to each grid according to one embodiment of the present disclosure.

Referring to FIG. 4, the target generating unit 120 may divide the ground plane into grids of a predetermined area, and generate a virtual target based on an approach direction of a fragment from a preset detonation point (region) toward each grid.

As an example, the target generating unit 120 may generate a virtual target by dividing the ground plane into grids having a predetermined area and generating a virtual plane perpendicular to an approach direction of a fragments to each grid. For example, the virtual plane may be generated to be perpendicular to a line segment connecting the preset detonation point and any one point (e.g., the center point) in each grid. For example, the area of the virtual target may be the same as the exposure area of the actual target, and the shape of the virtual plane may have a circular or rectangular shape. The angle of the virtual target generated with respect to the ground plane may be used as encounter elevation angle information with subsequent fragments.

Figure 5:
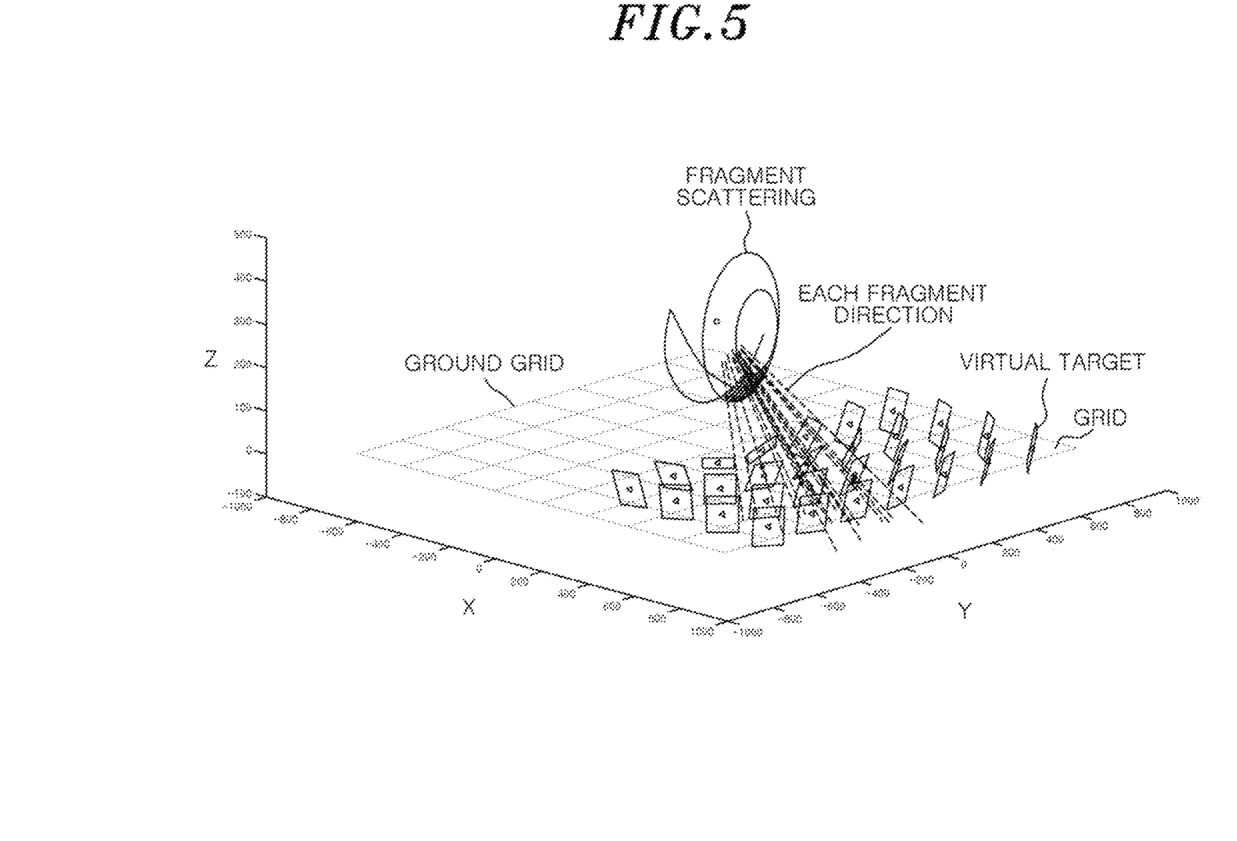
FIG. 5 is an exemplary diagram of an operation of extracting encounter information of a fragment to meet a virtual target according to one embodiment of the present disclosure.

FIG. 5 is an exemplary diagram of an operation of extracting encounter information of a fragment to meet a virtual target according to one embodiment of the present disclosure.

Referring to FIG. 5, the damage matrix generating unit 130 may extract encounter information of fragments that meet a virtual target as the fragments scatter in given directions based on the warhead fragment data. The encounter information may include information on the mass and the velocity of the fragment that meets the virtual target, and the encounter elevation angle of the virtual target and the fragment. In addition, the damage matrix generating unit 130 may extract fragments passing through a circle of a predetermined radius from the center of the virtual target among fragments encountered with the virtual target to extract encounter information of the fragments passing within the circle.

For example, the damage matrix calculation unit may extract virtual lines (e.g., each fragment scattering direction in FIG. 5) in which fragments scattering into the areas categorized in the warhead fragment data (e.g., the areas according to the polar angle and the azimuthal angle in FIG. 2) meet the virtual target, and determine a mass, velocity, and encounter elevation angle of the fragments that meet the respective virtual targets generated by the target generating unit 120.

Figure 6:
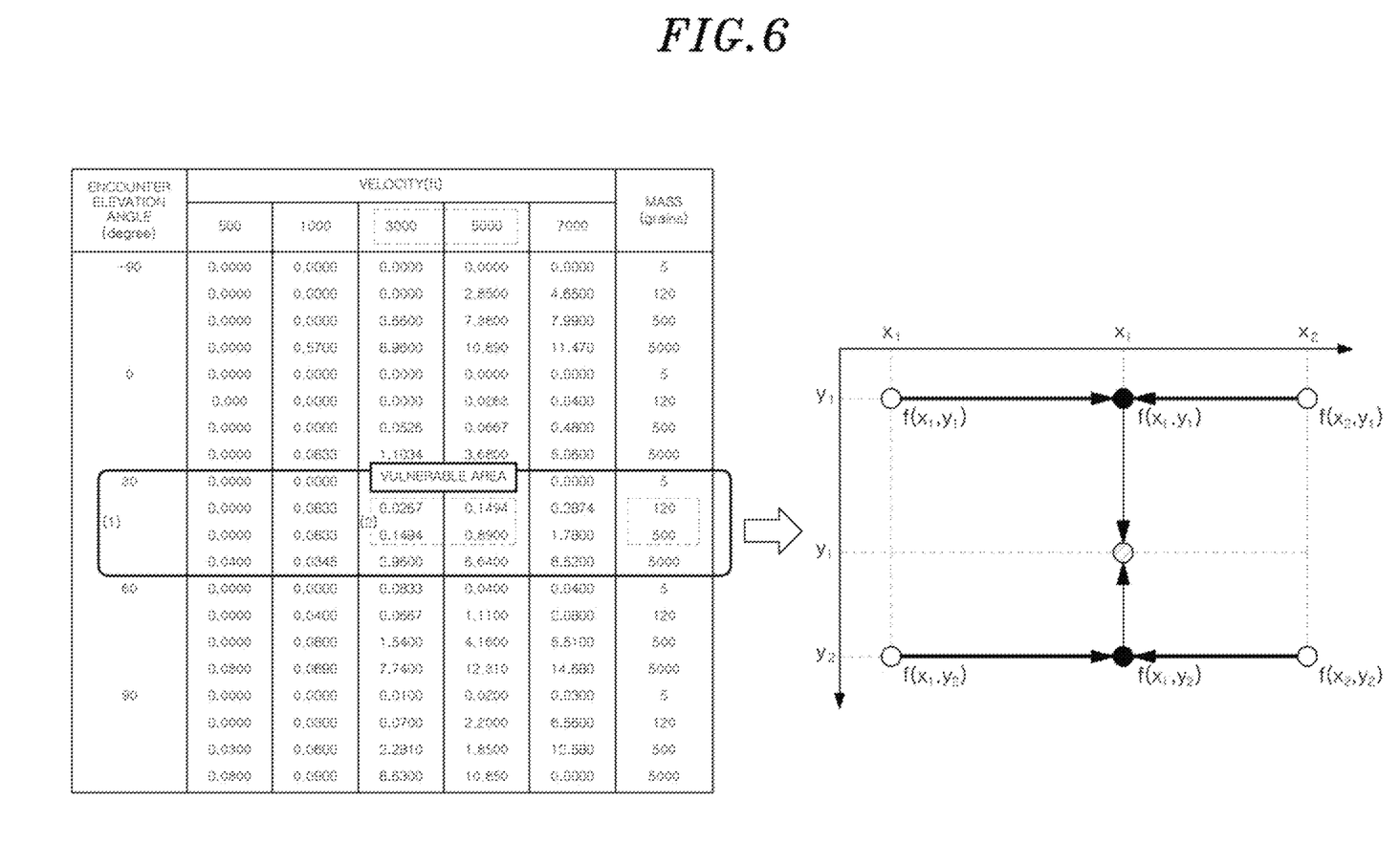
FIG. 6 is an exemplary diagram of an operation of applying a linear interpolation method to the target vulnerable area data according to one embodiment of the present disclosure.

FIG. 6 is an exemplary diagram of an operation of applying a linear interpolation method to the target vulnerable area data according to one embodiment of the present disclosure.

Referring to FIG. 6, the damage matrix generating unit 130 may generate a damage matrix by calculating a damage probability according to encounter information of fragments and a virtual target for each ground grid location.

As an example, the damage matrix generating unit 130 may calculate the damage probability for each grid location by applying a linear interpolation method in utilizing the target vulnerable area data and calculating and utilizing the vulnerable area for each grid location. For example, it is assumed that, according to the warhead fragment data for a virtual target generated on a grid, a fragment of a weight of 400 [grain] is simulated to meet at a speed of 4000 [ft/s] at an elevation angle of 40 degrees. At this time, referring to FIG. 6, since there is no data corresponding to "400 [grain], 4000 [ft/s], encounter elevation angle of 40 degrees", linear interpolation may be applied by using the values close thereto. The damage matrix generation unit 130 may select the category data of the encounter elevation angle of 30 degrees closest to the elevation angle of 40 degrees as shown in (1) of FIG. 6, select as the weight of the fragment, the upper and lower values 120 and 500) [grain] which are closets to the weight of the fragment (400 [grains]), and extract the data value (0.0267, 0.1494, 0.1494, 0.8900 [ft$^2$]) based on the vulnerable area of the velocity having the upper and lower values of 3000 and 5000 [ft/s] closest to the velocity 4000 [ft/s]. The damage matrix generating unit 130 may use the linear interpolation method on the extracted vulnerable area data value, and may calculate the vulnerable area for "400 [grain], 4000 [ft/s], encounter elevation angle of 40 degrees", i.e., "0.0885+(400−120)*(0.5197−0.0885)/(500−120)=0.4062 [ft$^2$]". The damage matrix generator 130 may calculate a damage probability for the grid for each fragment according to the following Eq. 1 using the exposure area of the grid and the calculated vulnerable area.

$$P_{K/D}(j) = \frac{A_V}{A_P} \quad [\text{Eq. 1}]$$

(where $A_V$ is the vulnerable area, $A_P$ is the exposure area of the grid, $P_{K/D}(j)$ is the probability of damage to the grid by j fragment)

Figure 7:
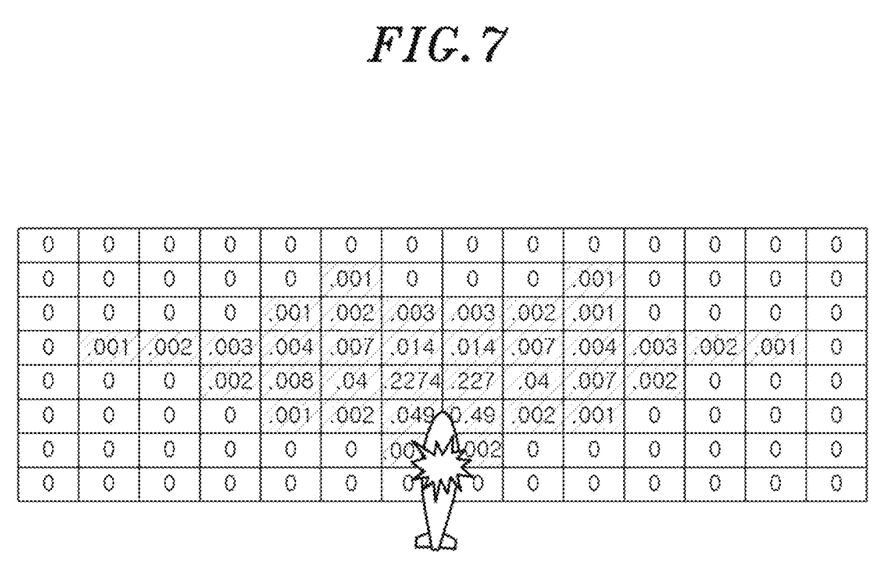
FIG. 7 is an exemplary diagram of a damage matrix generated according to one embodiment of the present disclosure.

FIG. 7 is an exemplary diagram of a damage matrix generated according to one embodiment of the present disclosure.

Referring to FIG. 7, the damage matrix generation unit 130 may generate a damage probability matrix by calculating damage probabilities for all fragments included in the warhead fragment data for each ground grid location.

As an example, the damage matrix generation unit 130 may calculate a damage probability for each fragment that meets the virtual target generated on each grid based on Eq. 1, and calculate the damage probability by all the fragments that meet the virtual target generated on each grid using the following Eq. 2.

$$P_{K/D} = 1 - \prod_{J=1}^{N}(1 - P_{K/D}(j)) \quad [\text{Eq. 2}]$$

(where j is identification information of each fragment, N is the number of fragments, $P_{K/D}(j)$ is the probability of damage to the grid by j fragment, $P_{K/D}$ is the probability of damage by all fragments in a specific grid)

Accordingly, the damage matrix generation unit 130 may generate a damage matrix in which the damage probability by all the fragments for each grid is generated as matrix information as shown in FIG. 7.

Figure 8:
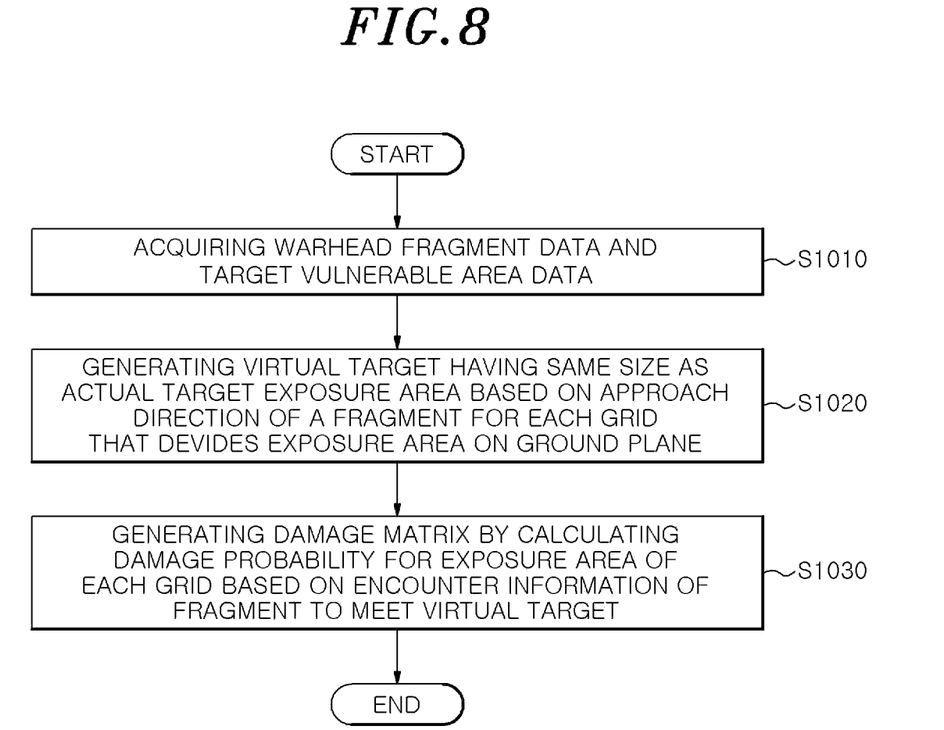
FIG. 8 is a flowchart of a method for generating a damage matrix according to one embodiment of the present disclosure.

FIG. 8 is a flowchart of a method for generating a damage matrix according to one embodiment of the present disclosure. Each step of the damage matrix generation method according to FIG. 8 may be performed by the damage matrix generating device 100 described with reference to FIG. 1, and each step will be described as follows.

In step S1010, the data management unit 110 may acquire the warhead fragment data and the target vulnerable area data.

In step S1020, the target generation unit 120 may generate a virtual target based on the approach direction of the fragments for each location on the ground plane. The virtual target may have the same size as the exposure area of the actual target.

In step S1030, the damage matrix generation unit 130 may generate a damage matrix by calculating a damage probability for each grid location based on encounter information in which the fragments meet the virtual targets.

Meanwhile, in addition to the steps illustrated in FIG. 8, since the data management unit 110, the target generation unit 120, and the damage matrix generation unit 130 perform various embodiments of performing the operations described with FIGS. 1 and 7, a new step performed by each functional block may be added to the steps of FIG. 8 as well. The configurations of the additional steps and the operations of the components which perform the steps have been described in FIGS. 1 to 7, redundant descriptions thereof will be omitted.

On the other hand, the above-described embodiments of the present disclosure may be implemented in form of a computer-readable storage medium storing a computer program programmed to perform each step included in the method or the computer program, stored in the computer-readable storage medium, programmed to perform each step included in the method.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A damage matrix generating device comprising:
   a memory; and
   a processor configured to control the memory to:
   acquire warhead fragment data obtained by classifying mass and number of fragments scattering in given directions as a warhead is detonated, and target vulnerable area data obtained by classifying a vulnerable area according to an encounter relationship between a fragment and a target;
   generate a virtual target based on an approach direction of the fragment to each of the grids, the grids dividing a ground plane; and
   generate a damage matrix by extracting encounter information of fragments to meet the virtual target as the fragments scatter in the given directions based on the warhead fragment data and calculating a damage probability for each ground location according to the encounter information based on the target vulnerable area data.

2. The damage matrix generating device of claim 1, wherein the processor is further configured to classify the mass and number of scattering fragments based on a polar angle and an azimuthal angle of a scattering direction of the fragments based on a detonation position.

3. The damage matrix generating device of claim 1, wherein the processor is further configured to divide the ground plane into the grids, and generate the virtual target by generating a virtual plane perpendicular to the approach direction of the fragment to each of the grids.

4. The damage matrix generating device of claim 3, wherein the virtual plane is perpendicular to a line segment connecting a point in each of the grids from a preset detonation point.

5. The damage matrix generating device of claim 3, wherein an area of the virtual target is equal to an exposure area of an actual target.

6. The damage matrix generating device of claim 5, wherein the virtual target has a shape of a circular area or a rectangular area equal to an exposure area of an actual target.

7. The damage matrix generating device of claim 1, wherein the encounter information includes information on a mass and a velocity of a fragment that meets the virtual target, and an encounter elevation angle of the virtual target and the fragment.

8. The damage matrix generating device of claim 7, wherein the processor is further configured to calculate a vulnerable area of the virtual target depending on the mass, the velocity, and the encounter elevation angle of the fragment by applying a linear interpolation method to the target vulnerable area data.

9. The damage matrix generating device of claim 1, wherein the processor is further configured to generate the damage matrix by calculating a damage probability for each grid location for all grids for the each ground location.

10. The damage matrix generating device of claim 1, wherein the processor is further configured to extract fragments passing through a circle of a preset radius from a center of the virtual target among fragments to meet the virtual target, and extract encounter information of fragments passing through the circle.

11. A damage matrix generating method performed by a damage matrix generating device, the method comprising:
   acquiring warhead fragment data obtained by classifying mass and number of fragments scattering in given directions as a warhead is detonated, and target vulnerable area data obtained by classifying a vulnerable area according to an encounter relationship of a fragment and a target;
   generating a virtual target based on an approach direction of the fragment to each of the grids, the grids dividing a ground plane; and
   generating a damage matrix by extracting encounter information of fragments to meet the virtual target as the fragments scatter in the given directions based on the warhead fragment data, and calculating a damage probability for each ground location according to the encounter information based on the target vulnerable area data.

12. The damage matrix generating method of claim 11, wherein acquiring the warhead fragment data and the target vulnerable area data comprises:
   classifying the mass and number of scattering fragments based on a polar angle and an azimuthal angle of a scattering direction of the fragments based on a detonation position.

13. The damage matrix generating method of claim 11, wherein generating the virtual target comprises:
  dividing the ground plane into the grids, and generate the virtual target by generating a virtual plane perpendicular to the approach direction of the fragment to each of the grids.

14. The damage matrix generating method of claim 11, wherein the encounter information includes information on a mass and a velocity of a fragment that meets the virtual target, and an encounter elevation angle of the virtual target and the fragment, and
  wherein generating the damage matrix comprises:
  calculating a vulnerable area of the virtual target depending on the mass, the velocity, and the encounter elevation angle of the fragment by applying a linear interpolation method to the target vulnerable area data.

15. The damage matrix generating method of claim 11, wherein generating the damage matrix comprises:
  extracting fragments passing through a circle of a preset radius from a center of the virtual target among fragments to meet the virtual target, and extract encounter information of fragments passing through the circle.

16. A non-transitory computer-readable recording medium storing instructions, when executed by one or more processors, configured to perform a damage matrix generating method, the method comprising:
  acquiring warhead fragment data obtained by classifying mass and number of fragments scattering in given directions as a warhead is detonated, and target vulnerable area data obtained by classifying a vulnerable area according to an encounter relationship of a fragment and a target;
  generating a virtual target based on an approach direction of the fragment to each of the grids, the grids dividing a ground plane; and
  generating a damage matrix by extracting encounter information of fragments to meet the virtual target as the fragments scatter in the given directions based on the warhead fragment data, and calculating a damage probability for each ground location according to the encounter information based on the target vulnerable area data.

\* \* \* \* \*